(12) United States Patent
Demeuleenaere et al.

(10) Patent No.: US 12,736,083 B2
(45) Date of Patent: Sep. 15, 2026

(54) METHOD OF REGULATING ELECTRICAL SUPPLY FOR A MAGNETIC BEARING CONTROL SYSTEM

(71) Applicant: ATLAS COPCO AIRPOWER N.V., Wilrijk (BE)

(72) Inventors: Bram Demeulenaere, Wilrijk (BE); Maarten Verbandt, Wilrijk (BE); Tom Schiepers, Wilrijk (BE); Gert Wouters, Wilrijk (BE)

(73) Assignee: ATLAS COPCO AIRPOWER N.V., Wilrijk (BE)

( * ) Notice: Subject to any disclaimer, the term of this patent is extended or adjusted under 35 U.S.C. 154(b) by 162 days.

(21) Appl. No.: 18/712,435

(22) PCT Filed: Dec. 16, 2022

(86) PCT No.: PCT/IB2022/000725
§ 371 (c)(1),
(2) Date: May 22, 2024

(87) PCT Pub. No.: WO2023/111682
PCT Pub. Date: Jun. 22, 2023

(65) Prior Publication Data

US 2025/0224000 A1 Jul. 10, 2025

Related U.S. Application Data

(60) Provisional application No. 63/291,143, filed on Dec. 17, 2021.

(51) Int. Cl.
*F16C 32/04* (2006.01)
*H02M 1/00* (2006.01)
(Continued)

(52) U.S. Cl.
CPC ...... *F16C 32/0451* (2013.01); *F16C 32/0497* (2013.01); *H02M 1/0025* (2021.05);
(Continued)

(58) Field of Classification Search
CPC . F16C 32/0451; F16C 32/0497; H02M 1/327; H02M 1/0025; H02M 1/0083; H02M 1/36; H02P 29/68
See application file for complete search history.

(56) References Cited

U.S. PATENT DOCUMENTS

2015/0211938 A1 7/2015 Imakiire et al.
2021/0044209 A1* 2/2021 Kawamura ....... H02M 3/33592

FOREIGN PATENT DOCUMENTS

EP 2863528 B1 7/2018
EP 3771083 A1 * 1/2021 ............ H02M 1/327
(Continued)

OTHER PUBLICATIONS

English translation of JP-2016061283-A (Year: 2016).*
(Continued)

*Primary Examiner* — Sean Gugger
(74) *Attorney, Agent, or Firm* — Sughrue Mion, PLLC

(57) ABSTRACT

A DC/DC voltage converter (108, 112), configured as an electrical supply for a magnetic bearing control system (111) including a regulation unit, configured to regulate the DC/DC voltage converter (108, 112) by restricting an output DC by a time-dependent limit value (502) based on a time-dependent critical temperature (500), indicative of a margin to an overheating limit of the DC/DC voltage converter (108, 112) on the basis of a thermal model thereof.

9 Claims, 2 Drawing Sheets

(51) Int. Cl.
*H02M 1/32* (2007.01)
*H02M 1/36* (2007.01)
*H02P 29/68* (2016.01)

(52) U.S. Cl.
CPC ......... *H02M 1/0083* (2021.05); *H02M 1/327* (2021.05); *H02M 1/36* (2013.01); *H02P 29/68* (2016.02)

(56) References Cited

FOREIGN PATENT DOCUMENTS

| | | | | |
|---|---|---|---|---|
| JP | 2005-325977 | A | | 11/2005 |
| JP | 2010-252512 | A | | 11/2010 |
| JP | 2016061283 | A | * | 4/2016 |
| JP | 2017-510229 | A | | 4/2017 |

OTHER PUBLICATIONS

Kun Wang et al, "Average power balance method for power failure compensation control of high-speed turbo molecular pump with AMB system", IET Electric Power Applications, Feb. 1, 2019, p. 190-197, vol. 13, Iss. 2.

International Search Report for PCT/IB2022/000725 dated May 3, 2023.

Written Opinion for PCT/IB2022/000725 dated May 3, 2023.

Japanese Office Action dated Aug. 14, 2025, issued in Japanese application No. 2024-536312.

Communication dated Mar. 30, 2026 issued by the Intellectual Property India Patent in application No. 202417047413.

Communication dated Mar. 10, 2026 issued by the Korean Patent Office in application No. 10-2024-7021947.

* cited by examiner

100
80
60
40
20
temperature [°C]
0
1
2
3
4
5
6
7
8
9
10
time [s]
500

30
20
10
0
current [ A]
time [s]
501
502

METHOD OF REGULATING ELECTRICAL SUPPLY FOR A MAGNETIC BEARING CONTROL SYSTEM

CROSS REFERENCE TO RELATED APPLICATIONS

This application is a National Stage of International Application No. PCT/IB2022/000725 filed Dec. 16, 2022, claiming priority based on U.S. Patent Application No. 63/291,143.

TECHNICAL AREA

The present invention relates to a DC/DC voltage converter for supplying electrical power to a magnetic bearing control system, such magnetic bearing control system, and a method of regulating such DC/DC voltage converter and such magnetic bearing control system.

STATE OF THE ART

A magnetic bearing is a bearing in which mechanical friction with a shaft is reduced or avoided by applying an electromagnetic field. In the case of a bearing-mounted shaft with the aid of a magnetic bearing, the shaft thus floats, as it were, on the magnetic field generated by means of coils around the shaft. As a result, a magnetic bearing does not need to be lubricated and is therefore oil and grease free.

Due to an active electromagnetic bearing, the shaft will be caused to float by the magnetic field and rotate substantially without friction.

To ensure a proper operation, sensors should measure deviations of the shaft with respect to a reference position. The shaft is brought and held in the desired position via control and power electronics. This control and power electronics may consist of various components, such as a DC/DC voltage converter and a magnetic bearing control system.

The DC/DC voltage converter provides a stable DC voltage supply to the magnetic bearing control system. The magnetic bearing control system then further provides an energizing current for the coils that generate the magnetic field. Possible deviations of the shaft with reference to the desired position are absorbed on the basis of measurements via sensors and a regulation and control algorithm by varying this energizing current.

A first deviation can occur during the start-up of a rotating machine, wherein the rotor is provided with one or more magnetic bearings. At start-up, the rotor will be accelerated from standstill until it reaches its nominal rotational speed. During this transient or transitional phenomenon, further vibrations may occur that cause the shaft to deviate from the desired position. The magnetic bearing control system will then energize the coils via the regulation and control algorithm in such a way that this deviation is minimized and that the shaft is brought into its desired position.

Deviations can also occur during the operation of the rotating machine, for example if the rotating machine is connected to another machine for supplying a mechanical torque to it, such as, for example, a compressor. When compressor surges arise due to an aerodynamic instability, this will have an effect on the driving machine and therefore also on the magnetic bearings. Here too, by the regulation, the magnetic bearing control system will then keep the shaft in the desired position.

Another deviation can also arise when the driving machine and the machine coupled to it are stopped for much the same reasons as during a start-up.

With these deviations, the magnitude of the energizing current of the coils to keep the magnetic bearings in the desired position will also show a transient behaviour. In other words, in a stable operation the shaft will be able to be held in the reference position by an equally stable energizing current, while its magnitude will change to anticipate the deviations, and subsequently to reconverge to a stable value when the steady state is reached.

In order to ensure a proper functioning of the magnetic bearing control system, according to the current state of the art, this system is electrically powered with a DC voltage source. With the abovementioned deviations, the regulation of this electrical supply consists of keeping the output DC voltage of the DC voltage source as constant as possible. Consequently, as a result of a high value of the energizing current, the values of the direct current extracted from the electrical supply, may also become high. To avoid a possible failure due to a too high value of this direct current, DC/DC voltage converters are over-dimensioned as power supply for magnetic bearing control systems. This is a disadvantage, both from an economic and technical point of view, because over-dimensioning leads to the use of more expensive materials, while on the other hand, it remains possible that the magnetic bearing control system technically does not need such over-dimensioning, or only in very exceptional cases.

It is therefore an object of the present invention to provide a method and device for regulating a DC/DC voltage converter configured as an electrical supply for a magnetic bearing control system which overcomes one or more of the described disadvantages of solutions from the state of the art. It is further an object to provide a method and device for regulating a magnetic bearing control system powered by such DC/DC voltage converter, as well as a motor controller comprising said DC/DC converter and said magnetic bearing control system.

SUMMARY OF THE INVENTION

According to the present invention, the object identified above is achieved by providing, according to a first aspect of the invention, a method of regulating a DC/DC voltage converter, according to claim 1, the DC/DC voltage converter being configured as an electrical supply for a magnetic bearing control system, the method comprising the steps of:

- converting an input DC voltage from the DC/DC voltage converter to an output DC voltage, suitable as the electrical supply;
- powering the magnetic bearing control system with the output DC voltage, thereby generating an output DC when active; and
- monitoring the output DC;

wherein the method further comprises the steps of:

- determining a time-dependent critical temperature, indicative of a margin to an overheating limit of the DC/DC voltage converter on the basis of a thermal model thereof;
- determining, on the basis of the time-dependent critical temperature, a time-dependent current saturation limit over a predefined time period, the current saturation limit being indicative of a warming-up of the DC/DC voltage converter over this predefined time period, thereby obtaining a time-dependent limit value for the output DC; and when the output DC exceeds the time-dependent limit value, the method further comprises the step of:

restricting the output DC to this limit value.

The DC/DC voltage converter serves as a power supply for the magnetic bearing control system by providing a DC voltage source. This DC voltage source, the value of which is referred to as output DC voltage, serves as an input voltage for the magnetic bearing control system. The output DC voltage is established by converting an input DC voltage from the DC/DC voltage converter present on a DC voltage rail. This value is also suitable as a value for the input voltage of the magnetic bearing control system.

The magnetic bearing control system is electrically powered during its operation, hence when active, such that a current will flow from the DC/DC voltage converter to the magnetic bearing control system. This current is further referred to as the output DC from the viewpoint of the DC/DC voltage converter.

Furthermore, a time-dependent critical temperature is determined, which is indicative of a margin to an overheating limit of the DC/DC voltage converter. The critical temperature is the temperature that the DC/DC voltage converter is allowed to reach without overheating, and is thus a limit value below which overheating is avoided. Overheating therefore means that the temperature of the DC/DC voltage converter is too high to ensure a proper operation thereof. This is because one or more components in the DC/DC voltage converter, such as electronic components, will exhibit unpredictable or unreliable behaviour or even fail if the temperature is too high.

This time-dependent critical temperature is determined on the basis of a themal model. This thermal model comprises measured quantities such as, preferably, the output DC and the ambient temperature, and further optionally the output DC voltage, the input DC voltage, an input DC and one or more internal temperatures.

Furthermore, the thermal model comprises a heat loss parameter, indicative of thermal losses of the DC/DC voltage converter when it is active, hence when an output DC flows from the DC/DC voltage converter to the magnetic bearing control system. As known to the person skilled in the art, an electric apparatus will always have losses in the form of unwanted heating thereof. Therefore, the heat loss parameter is an expression of joule losses, which are electrical losses in the conductors of the DC/DC voltage converter due to ohmic resistances therein. Furthermore, this heat loss parameter may also comprise other losses that may occur in electronic components of the DC/DC voltage converter. The heat loss parameter thus expresses the electrical losses of the DC/DC voltage converter that are converted into an unwanted heat, and thus cause the DC/DC voltage converter to heat up when active.

Optionally, the thermal model may include a cooling capacity parameter indicative of an active and/or passive cooling capacity of the DC/DC voltage converter. The cooling capacity parameter expresses to what extent the DC/DC voltage converter is designed to be able to cool down during operation. For example, an active cooling capacity is a fan that can be controlled, while a passive cooling capacity is, for example, a cooling plate mounted on the DC/DC voltage converter.

In addition, the thermal model includes a value of an equilibrium current, indicative of a thermal equilibrium of the DC/DC voltage converter when the output DC is equal to this value of the equilibrium current. The equilibrium current is that current at which the thermal losses of the DC/DC voltage converter are equal to the active and/or passive cooling capacity and thus, the temperature of the DC/DC voltage converter will remain constant when the output current is equal to this equilibrium current. Note, however, that its value cannot be determined a priori and is dependent on various parameters in addition to the active and/or passive cooling capacity, such as, for example, the ambient temperature in which the DC/DC voltage converter is installed, as well as other environmental parameters, such as the presence of an external ventilation, heating, and/or cooling.

Therefore, the equilibrium current is the current the DC/DC voltage converter is able to supply for an unlimited period of time without it overheating, because precisely this current will not cause further heating. An overload, as understood with respect to the present invention, is the situation in which the DC/DC voltage converter has to supply an output current that is higher than the equilibrium current discussed above, and therefore the situation in which it starts to heat up internally.

This situation may occur with deviations, such as speed transitions at start-up, a sudden external load on the motor whose shafts are mounted with magnetic bearings, a sudden load on the machine that drives this motor, or other factors that cause a deviation of the shafts with respect to a desired position, as known by the person skilled in the art.

On the basis of the thermal model as discussed above, the time-dependent critical temperature is determined, after which a time-dependent current saturation limit is determined on the basis of this time-dependent critical temperature, as previously determined. This current saturation limit, determined on the basis of the same thermal model, then expresses what is the largest possible constant output DC the DC/DC voltage converter is able to deliver over a predefined time period without overheating. It follows that restricting the output DC to a time-dependent limit value equal to this time-dependent current saturation limit is a sufficient condition to guarantee that the overheating limit of the DC/DC voltage converter will not be exceeded during the entire predefined time period. Note that this value can be higher than the equilibrium current, since, depending on the thermal condition of the DC/DC voltage converter, a warming-up is allowed and is dependent on the time-dependent critical temperature. In other words, if the critical temperature of the DC/DC voltage converter, at a given time, is lower than the overheating limit, a current is allowed that is higher than the equilibrium current.

Finally, according to a new and innovative aspect of the invention, instead of merely regulating the voltage, also the output DC is monitored, restricting it to its time-dependent limit value. During a certain time interval, a higher current than the equilibrium current can then be admitted, anticipating the avoidance of overheating. Therefore, the advantage of this method is that the restriction on the output DC is less strict, such that the output DC voltage decreases more slowly, such that, in case of a short-term overload, the magnetic bearing control system continues to function correctly or, in case of long-term overload, there is more time between, on the one hand, switching off the motor by the magnetic bearing control system and, on the other hand, switching off the magnetic bearing control system itself, causing the rotor to drop into the emergency bearings at a much lower speed.

According to an embodiment, the method further comprises the step of:

regulating the output DC voltage;

According to an embodiment of the invention, the method further comprises the step of, when the output DC voltage exceeds the predefined lower limit:

sending a control signal to the magnetic bearing control system including an instruction to switch off the magnetic bearing control system.

As additional security, the method can also ensure that the magnetic bearing control system is first switched off before the DC/DC voltage converter is switched off by sending an instruction to the magnetic bearing control system. This instruction can be sent if the output DC voltage decreases below the predefined lower limit. In other words, the response of the magnetic bearing control system to the control signal from the DC/DC voltage converter will not be to switch itself off, but to send a signal to the controlled motor drive to stop the motor. Subsequently, the magnetic bearing control system will try to keep the rotor levitated for as long as possible. The response of the magnetic bearing control system can also be caused by a control signal from the magnetic bearing control system itself, as this system itself also monitors its supply voltage.

The advantage of this is that the bearing-mounted machine can be safely brought to a standstill instead of a sudden stop. In this way, it is avoided that the machine, and in particular its shafts, are damaged.

According to a second aspect of the invention, a method is disclosed of regulating a magnetic bearing control system comprising an input connection connectable to a DC voltage source, a capacitor bank, and an output connection connectable to one or more magnetic bearings, the method comprising the steps of:

powering the magnetic bearing control system through the input connection with the output DC voltage as obtained by the method according to the first aspect of the invention;

storing electrical energy in the capacitor bank via the output DC as obtained by the method according to the first aspect of the invention;

energizing one or more magnetic bearings with an energizing current through the output connection;

wherein, when the output DC is restricted according to a step in the method according to the first aspect of the invention:

complementing the energizing current using the capacitor bank.

The method includes powering the magnetic bearing control system with the DC/DC voltage converter which is regulated according to the method of the first aspect of the invention. Via this electrical supply, one or more magnetic bearings are then energized with an energizing current. Furthermore, the electrical supply is used to charge the capacitor bank of the magnetic bearing control system. When the electrical supply of the DC/DC voltage converter is insufficient because, for example, its output DC is restricted by one of the steps as discussed above, the energizing current will be complemented by means of the capacitor bank. This means that the energizing current then consists partly of the converted output DC of the DC/DC voltage converter, and partly of a current originating from the capacitor bank.

The advantage of this is that a sudden failure can be avoided when, due to the restriction of the output DC of the DC/DC voltage converter, the electrical supply for the magnetic bearing control system is insufficient.

When the restriction of the output DC of the DC/DC voltage converter is then removed at a later time, the capacitor bank can be recharged in order to be able to anticipate a new restriction of this output DC at a later time.

According to a third aspect of the invention, there is disclosed a DC/DC voltage converter, configured as an electrical supply for a magnetic bearing control system comprising a regulation unit, configured to regulate the DC/DC voltage converter according to the first aspect of the invention.

According to a fourth aspect, there is disclosed a magnetic bearing control system, configured to energize one or more magnetic bearings, comprising a regulation unit, configured to perform the method of the second aspect of the invention.

According to a fifth aspect of the invention there is disclosed a motor controller for driving an electric motor, comprising:

a rectifier for rectifying an input alternating current;

a DC voltage rail for conducting the rectified input DC;

a frequency converter, connected to the DC voltage rail, for rectifying the rectified input alternating current as a supply the electric motor; and a DC/DC voltage converter according to the third aspect of the invention connected to the DC voltage rail.

The motor controller according to the fifth aspect may further comprise a magnetic bearing control system according to the fourth aspect of the invention, connected to the DC/DC voltage converter.

BRIEF DESCRIPTION OF THE DRAWINGS

The invention will be further illustrated with reference to the figures, in which FIG. 1 is a schematic representation of a frequency converter for an electric motor, a magnetic bearing control system with a DC/DC voltage converter and a motor with magnetic bearings;

FIG. 2 illustrates a voltage regulation loop of a DC/DC voltage converter;

FIG. 3 illustrates a voltage regulation loop of a DC/DC voltage converter with a restriction of the demanded current;

FIG. 4 illustrates a voltage regulation loop of a DC/DC voltage converter with variable restriction of the demanded current.

DETAILED DESCRIPTION OF THE EMBODIMENTS

Figures 5A, 5B:
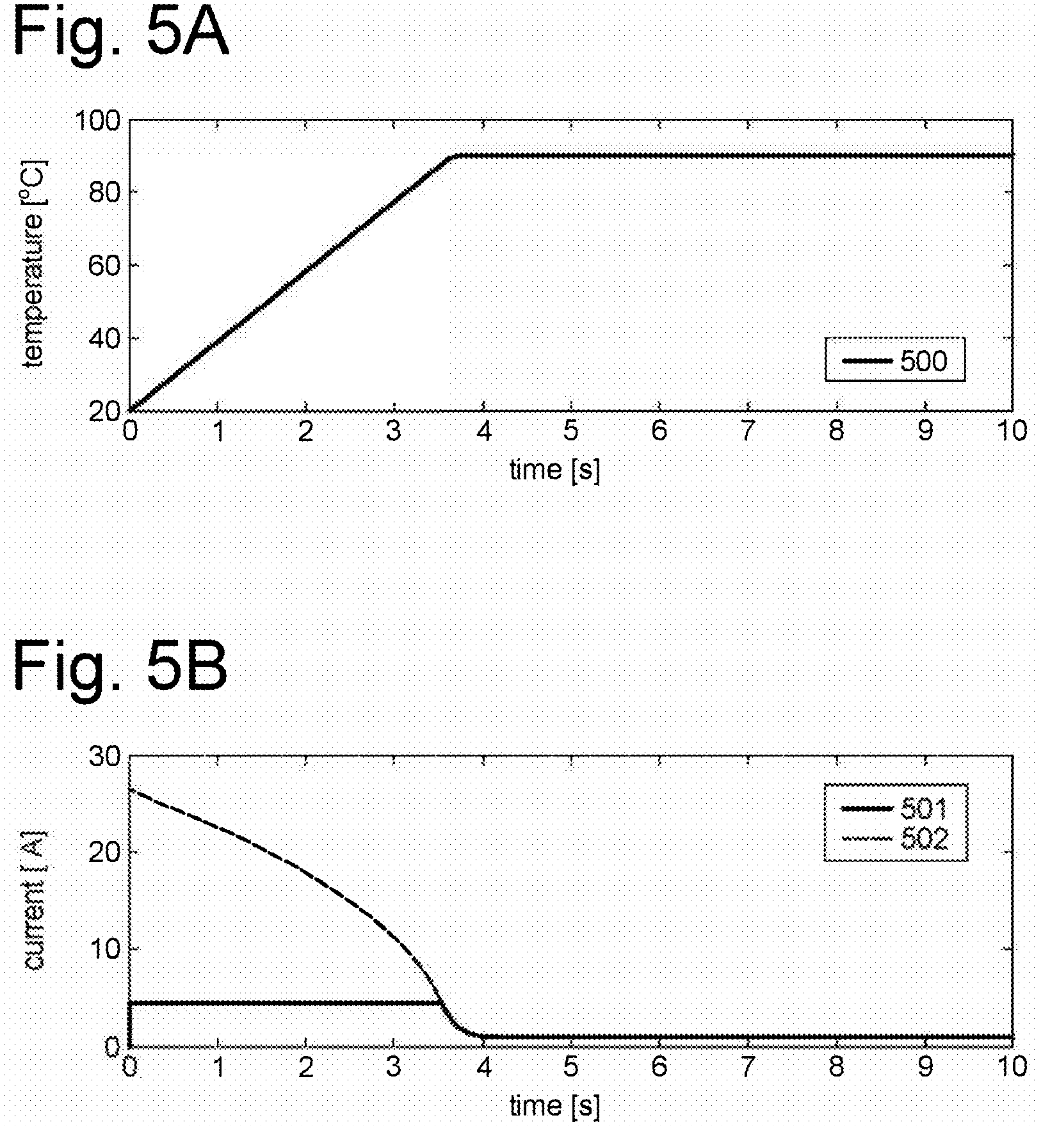
FIG. 5A illustrates a time-dependent critical temperature corresponding to a current saturation limit and progress of an output DC, as illustrated in FIG. 5B.

The present invention will be described with respect to certain embodiments and with reference to certain drawings, but the invention is not restricted thereto and is defined only by the claims. The drawings described are only schematic and non-limiting. In the drawings, the size of certain elements may be exaggerated and not drawn to scale for illustrative purposes. The dimensions and relative dimensions do not necessarily correspond to actual practice of the invention.

In addition, the terms first, second, third and the like are used in the description and in the claims to distinguish between similar elements and not necessarily to describe a sequential or chronological order. The terms are interchangeable under appropriate circumstances and the embodiments of the invention may be used in sequences other than those described or illustrated herein.

In addition, the terms top, bottom, over, under and the like are used in the description and claims for illustrative purposes and not necessarily to describe relative positions. The terms thus used are interchangeable under appropriate circumstances and the embodiments of the invention described herein may be used in orientations other than those described or illustrated herein.

Furthermore, the various embodiments, while referred to as "preferred embodiments", are to be construed as exemplifying how the invention may be practiced rather than as a limitation of the scope of the invention.

The term "comprising", used in the claims, is not to be construed as limited to the means or steps set forth below; the term does not exclude other elements or steps. The term should be interpreted as specifying the presence of said features, elements, steps or components referred to, but does not exclude the presence or the addition of one or more other features, elements, steps or components, or groups thereof. The scope of the expression "a device comprising means A and B" should therefore not be limited to devices consisting only of components A and B. The meaning is that, with respect to the present invention, only components A and B of the device are recited, and the claim is further to be construed as including equivalents of these components as well.

Figures 1, 2, 3, 4:
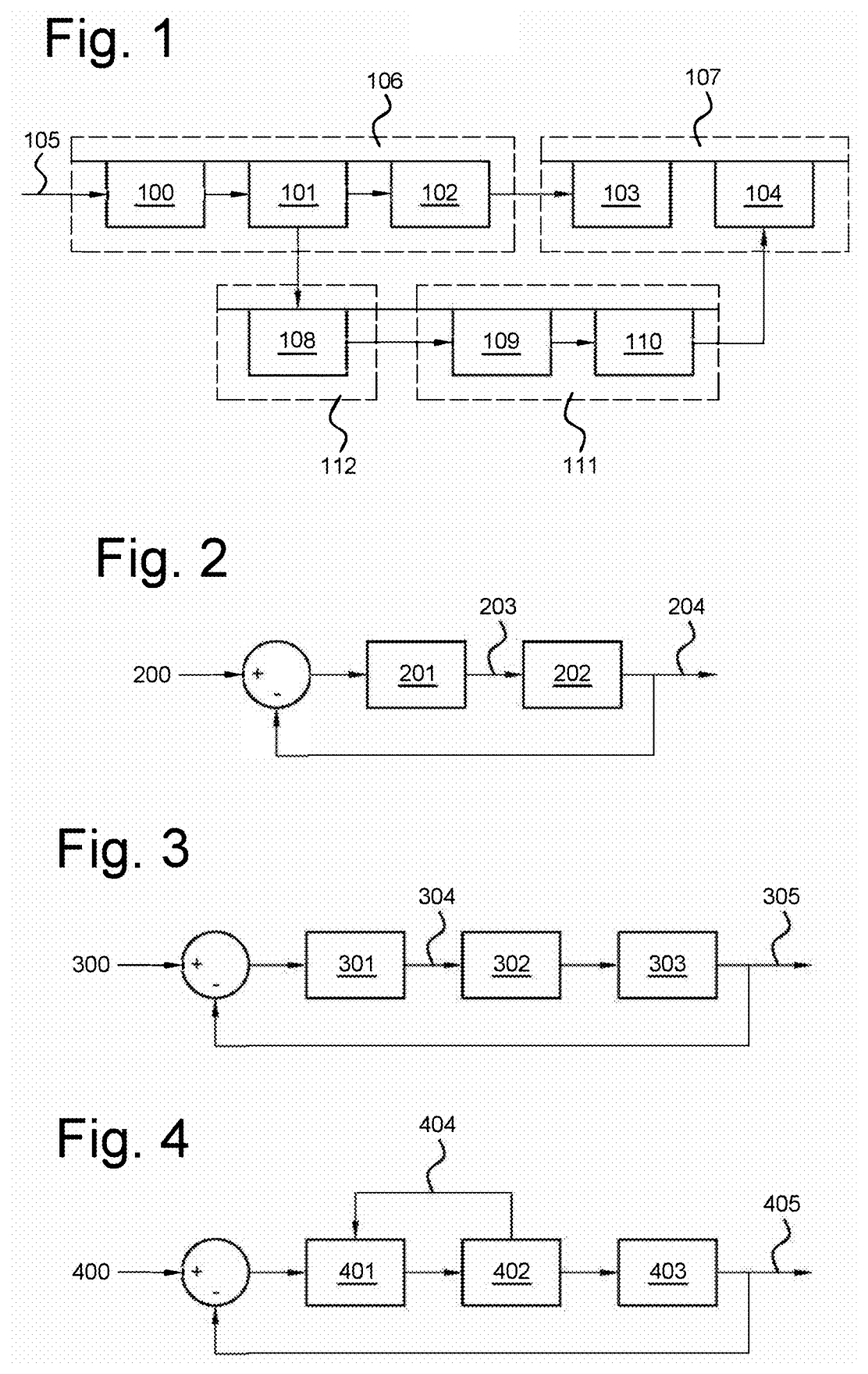

FIG. 1 is a schematic representation of a frequency converter 106 for an electric motor 107, the shafts of which are mounted with one or more magnetic bearings. Furthermore, FIG. 1 illustrates a magnetic bearing control system 111 and a DC/DC voltage converter 112. In the schematic representation of FIG. 1, the DC/DC voltage converter 112 is an external apparatus, but it should be further understood that it can also be integrated in the magnetic bearing control system 111 and thus be an internal apparatus, such that 111 and 112 are integral. Therefore, in the illustration of FIG. 1, references 108 and 112 refer to a DC/DC voltage converter, wherein reference 108 can be interpreted as being an internal apparatus of reference 111 if the DC/DC voltage converter is integrated into the magnetic bearing control system 111.

The frequency converter 106 for the electric motor 107 converts a fixed input AC voltage 105 into an AC voltage of regulatable frequency by first rectifying the fixed input AC voltage in a rectifier bridge 100 and subsequently converting the resulting DC voltage to an AC voltage with regulatable frequency in an inverter 102. A capacitor bank 101 between the rectifier 100 and the inverter 102 reduces the voltage ripple at the output of the rectifier bridge 100. The AC voltage with regulatable frequency feeds a motor stator 103.

The DC/DC voltage converter 112 converts its input DC voltage, originating from the capacitor bank 101, into an output DC voltage, suitable as an electrical supply for the magnetic bearing control system, MCS, 111. The MCS 111 is also provided with a capacitor bank 109 for reducing possible fluctuations in the output DC voltage of the DC/DC voltage converter 112. One or more power amplifiers 110 then convert the input DC voltage from the MCS 111 into a regulatable current that feeds the magnetic bearing system 104 in the motor.

The DC/DC voltage converter 112 is designed such that it converts a wide range of input DC voltage into a fixed, nominal output DC voltage $V_{MCS,nom}$, suitable for the MCS 111. However, if the input DC voltage decreases below a certain lower limit $V_{DCDC, min}$, the DC/DC voltage converter 112 switches itself off.

The power amplifiers 110 of the MCS 111 are designed such that they continue to function correctly even if the DC voltage, applied to the MCS 111, is lower than normal. However, the MCS 111 is provided with an internal voltage measurement whose purpose is to switch off the MCS 111 if the input DC voltage of the MCS 111 decreases below a certain lower limit $V_{MCS,min}$.

When the input AC voltage 105 from the electrical grid fails, the kinetic energy of the motor 107 is converted into electrical energy which is stored in the capacitor bank 101 of the motor 107, initially keeping the input voltage of the DC/DC voltage converter 112 high. As the motor 107 slows down, the input voltage of the DC/DC voltage converter 112 decreases. As long as the input voltage of the DC/DC voltage converter 112 is higher than $V_{DCDC,min}$, the output voltage of the DC/DC voltage converter 112 remains equal to the nominal voltage $V_{MCS, nom}$ such that the MCS 111 continues to function correctly. However, as soon as the input voltage decreases below $V_{DCDC,min}$, the DC/DC voltage converter 112 switches off, causing the input voltage of the MCS 111 to decrease below $V_{MCS,min}$ and the MCS 111 to switch off as well. Due to the substantial time between the failure of the electrical grid and reaching $V_{MBS, min}$, the MCS 111 is only switched off at a time when the motor 107 has already slowed down substantially, thus decreasing the possibility of damage to the motor 107 by switching off the magnetic bearing control system 104.

FIG. 2 illustrates a voltage regulation loop of a DC/DC voltage converter such as, for example, the DC/DC voltage converter 112 of FIG. 1. The purpose of the voltage regulation loop of the DC/DC voltage converter 112 is to adjust a direct current 204 $I_{DCDC}$ supplied by the DC/DC voltage converter 112 such that the output DC voltage $V_{MCS}$ 204 of the DC/DC voltage converter is regulated to a desired output DC voltage $V_{MBC,nom}$ 200. This regulation is based on feedback of the measured output DC voltage $V_{MCS}$ 204. On the basis of the regulation error $V_{MBC,nom}-V_{MCS}$, a voltage regulator 201 determines which is the desired current $I_{DCDC,wt}$ 203 that can eliminate the regulation error. The internal current regulation loop 202 of the DC/DC voltage regulator 201 then ensures that the actual realized current $I_{DCDC}$ 204 is as close as possible to the desired value $I_{DCDC,wt}$ 203.

As the DC/DC voltage converter 112 supplies larger currents $L_{DCDC}$ 204, the internal losses increase. When these losses exceed its internal cooling capacity, the temperature of the DC/DC voltage converter 112 rises. Conversely, when the internal losses are less than the internal cooling capacity, the temperature of the DC/DC voltage converter 112 decreases. The equilibrium current $I_{DCDC, ev}$ is then that current at which the internal losses are exactly as large as the internal cooling capacity and the temperature of the DC/DC voltage converter 112 thus remains constant. In other words, $I_{DCDC, ev}$ is the highest current that the DC/DC voltage converter 112 can supply for an unlimited period of time without it overheating.

Therefore, an overload is defined as a situation in which the DC/DC voltage converter 112 has to supply a higher current than the just-named equilibrium current $I_{DCDC, ev}$ and thus heats up internally. This situation occurs with deviations, such as speed transitions at start-up, a sudden external load on the motor whose shafts are mounted with magnetic bearings, a sudden load on the machine that drives this motor, or other factors that cause a deviation of the axes with respect to a desired position, as known by the person skilled in the art and as already listed above.

The internal temperature $T_{DCDC}$ of the DC/DC voltage converter 112 can generally be modelled as $$T_{DCDC}(t)=\int_0^t f(i_{DCDC}(\tau),x(\tau),i_{DCDC,ev}(\tau),p)d\tau.$$

The function f calculates the temperature increase per time unit, as a function of the measured direct current I_{DCDC}, possibly with additional measured quantities x, such as internal or external temperatures, internal or external voltages, the equilibrium current I_{DCDC,ev} and additional parameters p that complete the thermal model. The function f is positive if I_{DCDC}>I_{DCDC,ev}, negative if I_{DCDC}<I_{DCDC,ev}, and zero if I_{DCDC}=I_{DCDC,ev}. The model needs to be completed from a lower limit $T_{env}$, being the ambient temperature, to avoid obtaining non-physical results if I_{DCDC} is smaller than I_{DCDC,ev} for a longer time period, resulting in $$T_{DCDC}(t)=\max\left(\int_0^t f(i_{DCDC}(\tau),x(\tau),i_{DCDC,ev}(\tau),p)d\tau,\ T_{env}\right).$$

When implemented digitally, the thermal model can be recursively formulated as $T_{DCDC}$ [k+1]=max($T_{DCDC}$ [k]+$T_s$ f($i_{DCDC}$[k],x[k],$i_{DCDC,ev}$ [k],p),$T_{env}$), wherein $T_s$ is the sample period of the digital implementation of the recursion.

If, in order to keep the output DC voltage equal to V_{MBC,nom}, the DC/DC voltage converter 112 has to supply a higher current than I_{DCDC,ev}, that is, is overloaded, the DC/DC voltage converter 112 will heat up and there is a risk of overheating. A method known in the state of the art is to switch off the DC/DC voltage converter 112 in case of overload, either instantaneously, or with a certain delay. This method protects the DC/DC voltage converter 112 but has the detrimental effect of instantaneously switching off the MCS 111, leading to the potentially destructive dropping of the rotor into emergency bearings at high speed when present in the magnetic bearing control system 104.

The method of regulating the DC/DC voltage converter 112 according to the invention, is aimed at protecting the DC/DC voltage converter 112 in the event of an overload in such a way that the output DC voltage decreases as slowly as possible, such that, in the event of a short-term overload, the MCS 111 continues to function correctly or, in the case of a long-term overload, there is more time between, on the one hand, switching off the motor by the magnetic bearing control system and, on the other hand, switching off of the magnetic bearing control system itself, causing the rotor to drop into the emergency bearings at a much lower speed.

In a simple embodiment, the method implies that the supplied current is restricted to I_{DCDC,ev} at all times by entering a current restriction 302 between zero and I_{DCDC,ev} as shown in FIG. 3. Furthermore, the references in FIG. 3 correspond to the references of FIG. 2, being a desired output DC voltage V_{MBC, nom} 300, a voltage regulator 301 for determining a desired current I_{DCDC, wt} 304 that can regulate a regulation error, an internal current regulation loop 303, and an output DC voltage V_{MCS} and an output DC current I_{DCDC} 305, respectively. In this way, the DC/DC voltage converter 112 can continue to supply current and the MCS 111 will initially remain energized.

Due to restricting the current to I_{DCDC,ev}, the voltage regulation loop, as illustrated in FIG. 3 will no longer be able to maintain V_{MCS} and V_{MCS} will consequently decrease. If the overload condition lasts long enough, V_{MCS} will eventually decrease below V_{MCS, min} after which the MCS 111 switches off, the current demand decreases to zero and the DC/DC voltage converter 112 is allowed to cool down. If the overload condition does not last long, V_{MCS} will eventually increase again and normal operation of the system can resume until another overload.

An improvement of the method as illustrated in FIG. 3 means that an I_{DCDC} that is higher than I_{DCDC,ev} is temporarily allowed, albeit with the restriction that this higher current may not lead to overheating of the DC/DC voltage converter 112. This improved method is further illustrated in FIG. 4. Furthermore, the references in FIG. 4 also correspond to the references of FIG. 2 and FIG. 3, being a desired output DC voltage V_{MBC, nom} 400, a voltage regulator 401 for determining a desired current I_{DCDC, wt}, an internal current regulation loop 403, and an output DC voltage V_{MCS} and an output DC current I_{DCDC} 405, respectively. Furthermore, FIG. 4 also includes a current delimiter 402 such as in FIG. 3, but variable between zero and an upper limit as a function of I_{DCDC}. The advantage of this is that the restriction on I_{DCDC} then becomes less strict, as a result of which the voltage V_{MCS} decreases less quickly and thus the chance increases that the MCS 111 will continue to function correctly.

Imposing the restriction that the higher current should not lead to overheating of the DC/DC voltage converter 112 is done on the basis of a thermal model of the DC/DC voltage converter 112. Calculating this thermal restriction is done on the basis of the previously proposed recurrence relation $T_{DCDC}$ [k+1]=max($T_{DCDC}$ [k]+$T_s$ f($i_{DCDC}$ [k],x[k],$i_{DCDC,ev}$ [k],p),$T_{env}$) and assumes that the maximum allowable current I_{DCDC, max} is the current that leads to reaching the overheating limit $T_{DCDC,max}$ of the DC/DC voltage converter if that current is applied for a time interval Δt, being $T_{DCDC,max}$=$T_{DCDC}$ [k]+Δt f($i_{DCDC,max}$, x[k],$i_{DCDC,ev}$ [k],p), leading to $$\frac{T_{DCDC,max}-T_{DCDC}[k]}{\Delta t}=f(i_{DCDC,max},x[k],i_{DCDC,ev}[k],p).$$

On the basis of this last equation, the maximum permissible current I_{DCDC,max} can then be calculated.

Note further that, for reasons of practical implementation, both in the regulation scheme of FIG. 3 as of FIG. 4, it is desirable to provide the current regulation loop with an "anti-windup" functionality to prevent internal PI regulators from derailing when the current restriction I_{DCDC} becomes active.

With reference to FIGS. 5A and 5B, an example of a critical temperature versus output DC and current saturation limit, respectively is provided. In the examples considered, the overheating limit $T_{DCDC,max}$ of the DC/DC voltage converter is equal to 90 degrees Celsius, the ambient temperature $T_{env}$ is equal to 20 degrees Celsius and the equilibrium current I_{DCDC,ev} is equal to 1 A.

In FIG. 5A, on the horizontal axis, the time in seconds, and on the vertical axis, the temperature in degrees Celsius, is illustrated. The graph 500 represents a critical temperature of the DC/DC voltage converter 112 as a function of time.

In FIG. 5B, on the horizontal axis, the time in seconds, and on the vertical axis, the current in amps, is illustrated. The graph 501 illustrates an output DC extracted from the DC/DC voltage converter 112. The graph 502 illustrates the current saturation limit of the output DC.

FIGS. 5A and 5B considers an example wherein the DC/DC voltage converter needs a constant output DC of 4.5 A to regulate the output DC voltage to the proper value. The critical temperature 500 starts at ambient temperature and begins to increase as the output DC 501 of 4.5 A exceeds the equilibrium current of 1 A. The time-dependent current saturation limit 502 starts at a value of 26.5 A, far above the equilibrium current, because, at the start, there is still a large thermal margin of 90–20=70 degrees Celsius. However, as the critical temperature increases and thus the themal margin decreases, the time-dependent current saturation limit also decreases. After 3.5 seconds, the time-dependent current saturation limit has decreased to 4.5 A, such that from this moment on the output DC is restricted by the time-dependent, furthe decreasing value of the current saturation limit. Theoretically, after an infinitely long time, in practice after about 4.5 seconds, the critical temperature reaches the overheating limit of 90 degrees, causing the time-dependent current saturation limit and the output DC to coincide from that point on with the equilibrium current of 1 A, leading to a constant critical temperature equal to 90 degrees.

The invention claimed is:

1. A method of regulating a DC/DC voltage converter (108, 112), configured as an electrical supply for a magnetic bearing control system (111), the method comprising the steps of:
- converting an input DC voltage from the DC/DC voltage converter (108, 112) to an output DC voltage, suitable as the electrical supply;
- powering the magnetic bearing control system (111) with the output DC voltage, thereby generating an output DC current when active; and
- monitoring the output DC current;
- wherein the method further comprises the steps of:
- determining a time-dependent critical temperature (500), indicative of a margin to an overheating limit of the DC/DC voltage converter (108, 112) on the basis of a thermal model thereof, the thermal model comprising one or more of the group of:
  - a heat loss parameter, indicative of thermal losses of the DC/DC voltage converter (108, 112) when active;
  - a cooling capacity parameter, indicative of an active and/or passive cooling power of the DC/DC voltage converter (108, 112); and
  - an equilibrium current, indicative of a thermal equilibrium of the DC/DC voltage converter (108, 112) when the output DC current is equal thereto
- determining, on the basis of the critical temperature (500), a time-dependent current saturation limit (502) over a predefined time period, the current saturation limit (502) being indicative of a warming-up of the DC/DC voltage converter (108, 112) over this predefined time period, thereby obtaining a time-dependent limit value for the output DC current; and
- when the output DC current exceeds the time-dependent limit value, the method further comprises the step of:
- limiting the output DC current to the limit value.

2. The method according to claim 1, the thermal model comprising one or more measured quantities from the group of the output DC current, the output DC voltage, the input DC voltage, an input DC current, one or more internal temperatures, and/or an ambient temperature.

3. The method according to claim 1, further comprising the step of:
- regulating the output DC voltage.

4. The method of claim 3, further comprising the step of, when the output DC voltage exceeds a predefined lower limit:
- sending a control signal to the magnetic bearing control system (111), including an instruction to switch off the magnetic bearing control system (111).

5. A method of regulating a magnetic bearing control system (111) comprising an input connection connectable to a DC voltage source, a capacitor bank, and an output connection, connectable to one or more magnetic bearings, the method comprising the steps of:
- powering the magnetic bearing control system (111) through the input connection with the output DC voltage as obtained by the method of claim 1;
- storing electrical energy in the capacitor bank via the output DC current as obtained by the method of claim 1;
- energizing the one or more magnetic bearings with an energizing current through the output connection; and
- complementing the energizing current using the capacitor bank.

6. A DC/DC voltage converter (108, 112), configured as an electrical supply for a magnetic bearing control system (111) comprising a regulation unit, configured to regulate the DC/DC voltage converter (108, 112) according to the method of claim 1.

7. A magnetic bearing control system (111), configured to energize the one or more magnetic bearings, comprising a regulation unit, configured to perform the method of claim 5.

8. A motor controller for driving an electric motor (107), comprising:
- a rectifier (100) for rectifying an input AC voltage (105);
- a DC voltage rail for conducting the rectified input DC;
- an inverter (102), connected to the DC voltage rail, for rectifying the rectified input alternating current as a supply of the electric motor (107); and
- a DC/DC voltage converter (108, 112) according to claim 7, connected to the DC voltage rail.

9. The motor controller according to claim 8, further comprising the magnetic bearing control system (111) connected to the DC/DC voltage converter (108, 112).

* * * * *